(12) United States Patent
Matsumiya et al.

(10) Patent No.: US 7,528,968 B2
(45) Date of Patent: May 5, 2009

(54) OPTICAL MEASURING MACHINE

(75) Inventors: Sadayuki Matsumiya, Kawasaki (JP);
Kenji Okabe, Kawasaki (JP); Seiji Shimokawa, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 12/078,929

(22) Filed: Apr. 8, 2008

(65) Prior Publication Data
US 2008/0252904 A1    Oct. 16, 2008

(30) Foreign Application Priority Data
Apr. 12, 2007    (JP)    ............................. 2007-104562

(51) Int. Cl.
*G01B 11/14* (2006.01)
(52) U.S. Cl. ...................................... 356/625; 356/601
(58) Field of Classification Search ................ 356/601, 356/614, 625
See application file for complete search history.

(56) References Cited

U.S. PATENT DOCUMENTS

| 6,452,625 | B1 * | 9/2002 | Kapitza ....................... 348/80 |
| 2003/0103137 | A1 | 6/2003 | Espertshuber et al. |
| 2003/0164945 | A1 | 9/2003 | Lee |

FOREIGN PATENT DOCUMENTS

| DE | 196 35 666 C1 | 12/1997 |
| DE | 101 56 210 A1 | 6/2003 |
| JP | A-05-264216 | 10/1993 |
| JP | A-07-120215 | 5/1995 |

* cited by examiner

*Primary Examiner*—Roy Punnoose
(74) *Attorney, Agent, or Firm*—Oliff & Berridge, PLC

(57) ABSTRACT

An optical measuring machine includes a screen having a reference line, a movable stage, a detector for detecting a displacement of the stage, the first and second image-forming units for forming optical image(s) of a target object mounted on the stage on the screen, and a storage for storing the optical image(s). The first image-forming unit includes an image pickup for picking up the optical image(s), an output unit for outputting the picked up optical image(s) in digital image data, and a projecting unit for projecting the optical image(s) on the screen in accordance with the image data output by the output unit. The storage stores the image data output by the output unit.

8 Claims, 6 Drawing Sheets

OPTICAL MEASURING MACHINE

BACKGROUND OF THE INVENTION

1. Field of the Invention

The present invention relates to an optical measuring machine for forming optical image(s) of a target object mounted on a stage on a screen.

2. Description of Related Art

There have been known optical measuring machines such as projectors, an example of which: irradiates illumination light on a target object mounted on a stage; projects light transmitted or reflected from the target object on a screen in a magnified manner; and measures a dimension, a shape or the like of the target object based on optical image(s) formed on the screen in a magnified manner.

For instance, a projector with a two-axis linear encoder being provided on the stage thereof can measure a dimension, a shape or the like of the target object by aligning a target portion (e.g., edge section) of the optical image of the target object formed on the screen to a reference point on the screen and reading its two-dimensional coordinate on the stage at this time.

When the optical image(s) needs to be stored while such an optical measuring machine is being used, a general method is to directly photograph the screen on which the optical image(s) is formed using a photographic device such as a silver salt camera or a digital camera.

Document 1 (JP-A-5-264216) discloses a projector capable of photographing a portion of the optical image(s) using a dedicated photographing unit provided behind the screen.

However, when images are stored using a photographic device such as a camera, the stored images may vary depending on photographing conditions such as device type, illuminating method and photographing method, and photographers. In addition, in photographing the optical image(s), a photographic device such as a camera is required to be prepared separately from the optical measuring machine, which may lead to complication of operation(s).

When the projector according to Document 1 is used, the entirety of the optical image(s) cannot be visually observed when photographed because a dedicated photographing unit is required to be provided behind the screen. Accordingly, it has been difficult to simultaneously conduct photographing and a measurement.

SUMMARY OF THE INVENTION

An object of the present invention is to provide an optical measuring machine capable of storing optical image(s) of an object without separately requiring a photographic device while simultaneously measuring the object.

An optical measuring machine according to an aspect of the present invention includes: a screen; a movable stage; an illuminator that irradiates light on a target object mounted on the stage; a detector that detects a displacement of the stage; a first image-forming unit and a second image-forming unit that respectively form an optical image of the target object mounted on the stage on the screen; a switch that switches image-forming units used for forming the optical image on the screen between the first image-forming unit and the second image-forming unit; and a storage that stores the optical image, in which the first image-forming unit includes: an image pickup that picks up the optical image; an output unit that outputs the optical image picked up by the image pickup as digital image data; and a projecting unit that projects the optical image on the screen in accordance with the image data output by the output unit, the second image-forming unit includes a projection lens that projects on the screen the light irradiated by the illuminator and reflected or transmitted by the target object, and the storage stores the image data output by the output unit of the first image-forming unit.

According to this aspect, the output unit outputs the optical image(s) of the target object picked up by the image pickup of the first image-forming unit as digital image data. The projecting unit projects the optical image(s) on the screen in accordance with the image data while the storage stores the image data.

When the image data is stored, the optical image(s) of the target object can be derived from the image data. In other words, the optical image(s) can be stored using the storage.

Since the storage included in the optical measuring machine stores the image data, there is no need to separately prepare a photographic device, or there is no need to provide a photographing unit to the optical measuring machine. With this arrangement, the stored optical images are less likely to vary depending on photographing conditions and photographers. Since there is no need to provide a dedicated photographing unit behind the screen unlike Document 1, the entirety of the optical image(s) can be observed without hindrance because no photographing unit impedes the projection of images by the projecting unit.

Thus, without requiring a photographic device to be separately prepared, the optical measuring machine according to the present invention can store the optical image(s) while simultaneously measuring the target object.

Another advantage of the optical measuring machine according to the present invention including the screen and the first image-forming unit is that the optical measuring machine can be operated in the same manner as a conventional so-called projector.

In addition, by selecting either one of the first image-forming unit and the second image-forming unit by the switch, the optical image(s) of the target object can be projected on the screen.

The second image-forming unit, which includes a projection lens for projecting light from the target object on the screen, is arranged in the same manner as an optical system provided in a conventional so-called projector. Thus, when measurement is conducted with the second image-forming unit, a dimension, a shape or the like of the target object can be measured by the same operation(s) as a conventional projector.

When the optical image(s) is required to be stored while measurement by the second image-forming unit is being conducted, the image-forming unit can be easily switched to the first image-forming unit by the switch, so that the optical image(s) can be stored.

When the first image-forming unit is used, for instance, slight difference(s) in hue, brightness or the like may not be accurately displayed because the first image-forming unit converts the optical image(s) into image data for outputting and reconverts the output image data into the optical image(s) to display the optical image(s). On the other hand, since there is no conversion of the optical image(s) when the second image-forming unit is used, such slight difference(s) in hue, brightness or the like can be accurately displayed.

According to the aspect of the present invention, it is preferable that the projecting unit includes: a liquid crystal panel that displays the optical image in accordance with the image data; and a light source that irradiates light on the liquid crystal panel, and the projecting unit projects the optical image using the light that is: irradiated by the light source; and reflected or transmitted by the liquid crystal panel.

According to the above arrangement, the projector projects the optical image(s) of the target object on the screen using light irradiated from the light source and reflected or transmitted by the liquid crystal panel.

In general, a liquid crystal panel, which is small in size and consumes less electric power, is capable of highly finely displaying image(s).

Since the projecting unit uses the liquid crystal panel in the optical measuring machine according to the present invention, the optical image(s) can be highly finely projected on the screen, and the machine arrangement can be simplified while electric power is saved.

According to the aspect of the present invention, the optical measuring machine preferably further includes a computer that computes positional information of target portion(s) of the target object, in which the computer computes the positional information of the target portion(s) based on the image data and the displacement of the stage detected by the detector.

According to the above arrangement, the computer computes the positional information of the target portion(s) based on the image data and the displacement of the stage detected by the detector. Further, the computer can derive a dimension, a shape or the like of the target object from the positional information of the plural target portions.

For instance, by arranging the computer to specify the target portion(s) such as edge section, measurement errors due to a sensory difference between operators can be prevented, whereby a measurement of high accuracy can be conducted.

The image data may include previously-stored data. The calculator may compute the positional information of the target portion(s) contained in the previously-stored image data based on the previously-stored data.

According to the aspect of the present invention, the optical measuring machine preferably further includes an information-image generator that generates an information image for displaying measurement-related information, in which the output unit outputs as digital image data both the information image generated by the information-image generator and the optical image picked up by the image pickup.

According to the above arrangement, the information-image generator generates the information image(s) for displaying measurement-related information, and the output unit outputs the information image(s) and the optical image(s) together as digital image data Then, the first image-forming unit forms the information image(s) and the optical image(s) on the screen.

Accordingly, an operator can measure a dimension, a shape or the like of the target object while observing measurement-related information using the information image(s) formed on the screen.

Examples of the measurement-related information are a standard shape pattern, a shape pattern customized by an operator, and determination of tolerance between the patterns and the actually-measured shape.

An exemplary method of combining the information image(s) and the optical image(s) is to superpose a diagram representing a standard shape pattern on the optical image(s) as overlay chart.

According to the aspect of the present invention, the optical measuring machine preferably further includes a half mirror provided on an optical path extending from the projection lens of the second image-forming unit to the screen, in which the first image-forming unit forms the optical image on the screen using light reflected or transmitted by the half mirror, the second image-forming unit forms the optical image on the screen using the light transmitted or reflected by the half mirror, and the switch includes a stopper that stops irradiation of the light from either one of the image-forming units selected from the first image-forming unit and the second image-forming unit to the half mirror.

With this arrangement, one of the first image-forming unit and the second image-forming unit projects the optical image(s) on the screen using the light transmitted through the half mirror while the other projects the optical image(s) on the screen using the light reflected by the half mirror. The stopper stops irradiation of light from either one of the image-forming units selected from the first image-forming unit and the second image-forming unit to the half mirror.

In other words, the optical image(s) is formed on the screen by either one of the first image-forming unit and the second image-forming unit.

Thus, with a simple arrangement using the half mirror and the stopper, the image-forming units can be switched between the first image-forming unit and the second image-forming unit.

According to the aspect of the present invention, it is preferable that the projecting unit of the first image-forming unit is provided at a waiting position located outside of the optical path extending from the projection lens of the second image-forming unit to the screen, the switch includes: a shifter that moves the projecting unit between the waiting position and a projecting position, the projecting position being a position at which the projecting unit is capable of irradiating the light on the screen; and a stopper that stops irradiation of the light from the second image-forming unit to the screen, and the stopper stops the irradiation of the light from the second image-forming unit to the screen when the projecting unit is positioned at the projecting position.

According to the above arrangement, the shifter moves the projecting unit between the waiting position and the projecting position. When the projecting unit is positioned at the projecting position, the stopper stops the light irradiation from the second image-forming unit to the screen.

Accordingly, the optical image(s) is formed on the screen by the second image-forming unit when the projecting unit is positioned at the waiting position while the optical image(s) is formed on the screen by the first image-forming unit when the projecting unit is positioned at the projecting position.

In other words, the optical image(s) is formed on the screen by either one of the first image-forming unit and the second image-forming unit.

Thus, with a simple arrangement using the shifter and the stopper, the image-forming units can be switched between the first image-forming unit and the second image-forming unit.

DETAILED DESCRIPTION OF PREFERRED EMBODIMENT(S)

Embodiment(s) of an optical measuring machine according to the present invention will be described below with reference to the attached drawings.

First Embodiment

[Arrangement of Optical Measuring Machine]

Figure 1:
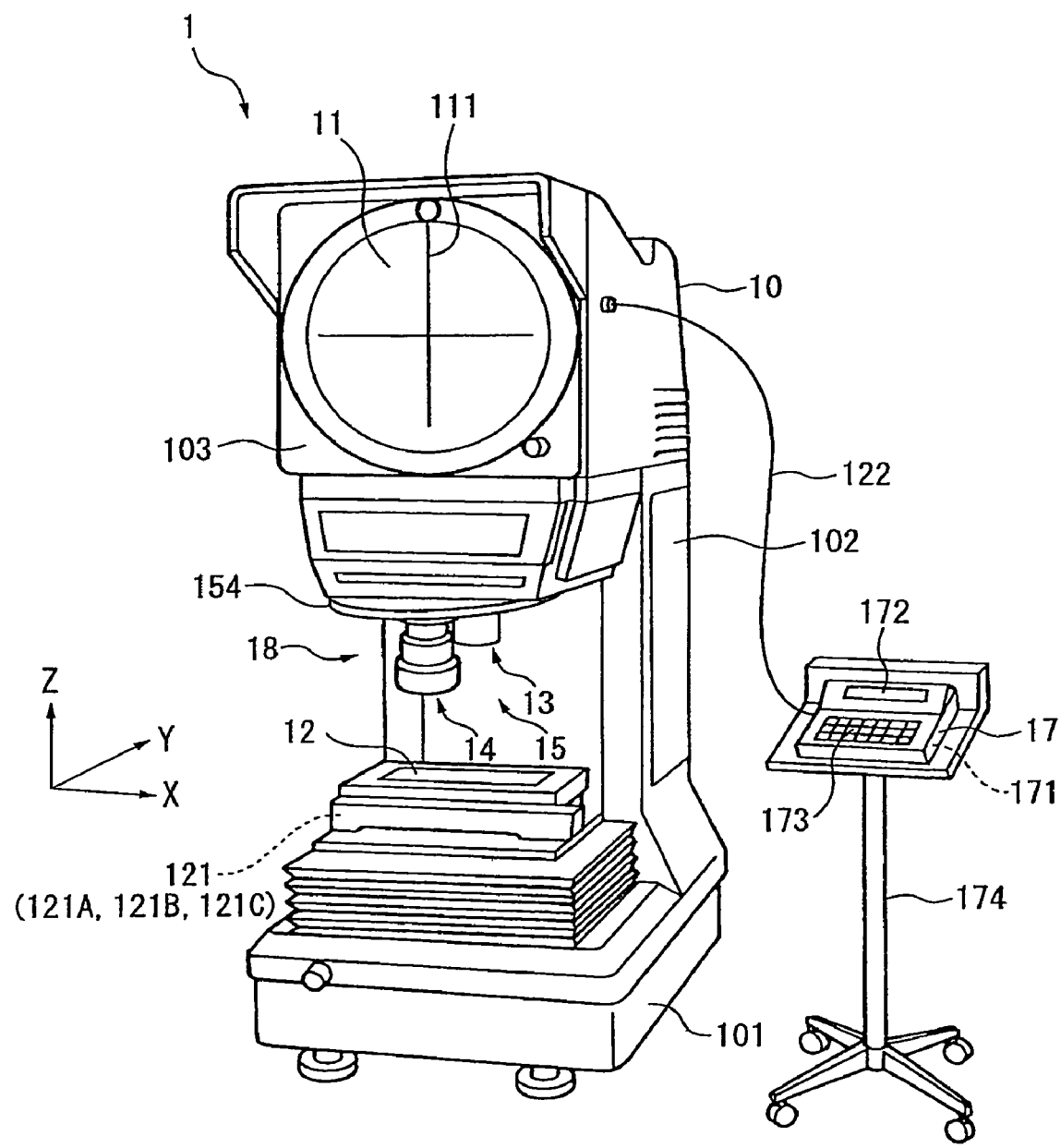
FIG. 1 is a perspective view showing an optical measuring machine according to a first embodiment of the present invention.

FIG. 1 is a perspective view showing an optical measuring machine 1 according to the present embodiment.

As shown in FIG. 1, the optical measuring machine 1 includes: a body 10; a screen 11; a stage 12 on which a target object is mounted; an illuminator 18 for irradiating light on the target object; a detector 121 for detecting a displacement of the stage 12; a first image-forming unit 13 and a second image-forming unit 14 for forming optical image(s) of the target object on the screen 11; a switch 15 for switching the image-forming units to be used for forming the optical image(s) of the target object on the screen 11 between the first and second image-forming units 13, 14; and an operation terminal 17 provided with a storage 171 for storing the optical image(s).

The body 10 includes: a base 101 having the stage 12; a trunk 102 provided on an upper end of the base 101; and a head 103 provided on a front upper portion of the trunk 102.

The screen 11 includes cross hairs 111 provided on a front face of the head 103 of the body 10. The cross hairs 111 serve as a reference line to be used when the measurement is visually conducted.

The cross hairs 111 are two straight lines perpendicular to each other at the center of the circular screen 11.

The stage 12, which is provided on an upper face of the base 101 of the body 10 in a manner movable in X, Y and Z directions perpendicular to one another, accommodates three linear encoders 121A, 121B, 121C that serve as the detector 121 for detecting the displacement of the stage 12 in the directions respectively.

In FIG. 1, the front-back direction corresponds to Y direction, the horizontal direction corresponds to X direction and the vertical direction corresponds to Z direction. In the screen 11, the horizontal direction corresponds to X direction and the vertical direction corresponds to Y direction.

Figure 2:
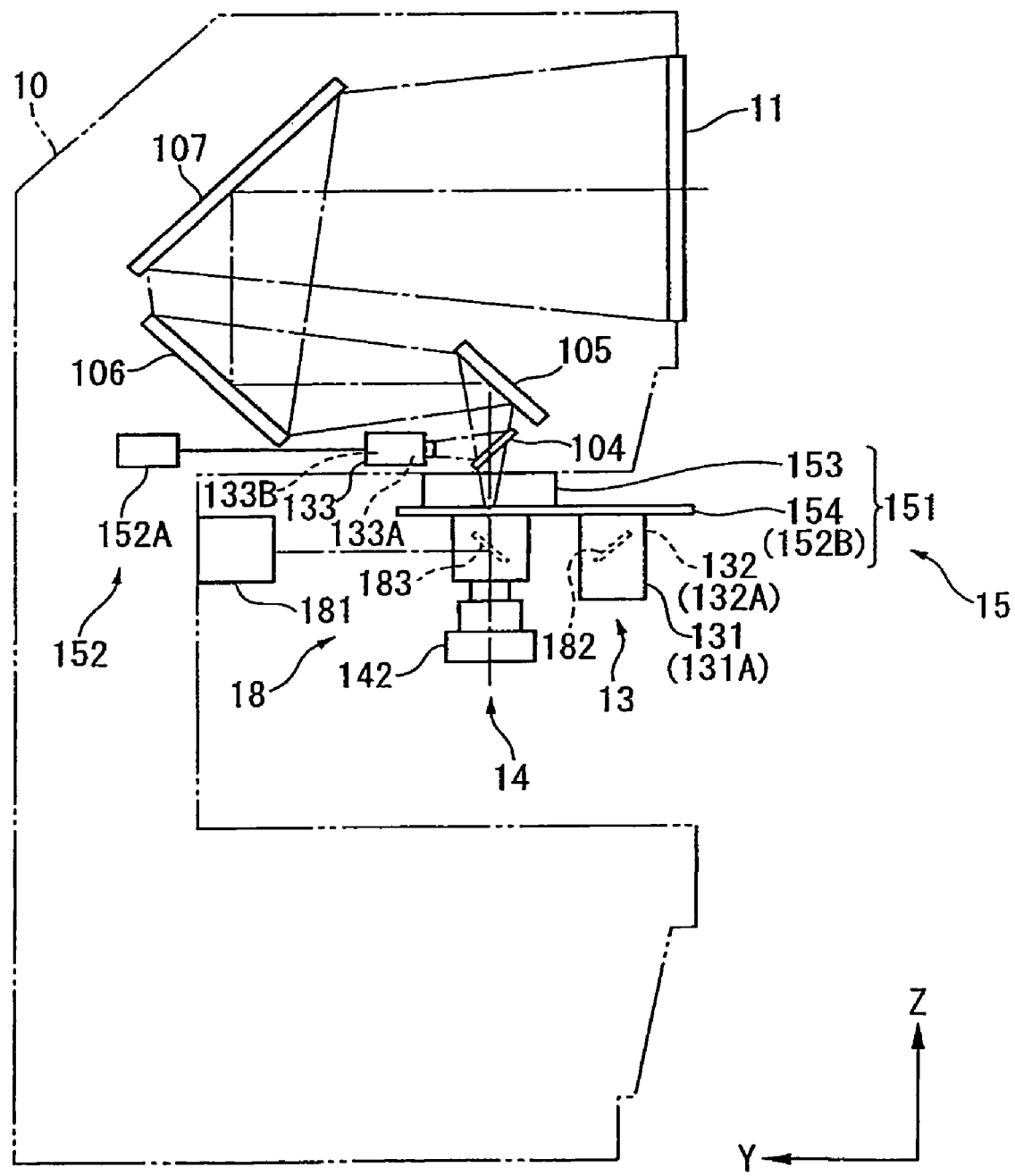
FIG. 2 schematically shows arrangements of a first image-forming unit, a second image-forming unit and a switch of the optical measuring machine according to the first embodiment.

FIG. 2 schematically shows arrangements of the first image-forming unit 13, the second image-forming unit 14, the switch 15 and the illuminator 18. FIG. 2 does not show some arrangements such as the stage 12.

As shown in FIG. 2, the first image-forming unit 13 includes: an image pickup 131 for picking up the optical image(s) of the target object; an output unit 132 for outputting the optical image(s) picked up by the image pickup 131 as digital image data; and a projecting unit 133 for projecting the optical image(s) on the screen 11 in accordance with the image data output by the output unit 132.

The image pickup 131, which is a camera 131A provided below the head 103 of the body 10, includes a pickup lens and an image sensor provided above the pickup lens. The image sensor may exemplarily be a CCD (charge coupled device) or the like.

The output unit 132 is an output circuit 132A housed in the camera 131A, and the output circuit 132A outputs the optical image(s) picked up by the image sensor of the image pickup 131 as digital image data.

The projecting unit 133, which is provided adjacent to the bottom of the head 103 within the head 103 of the body 10, includes a liquid crystal panel 133A for displaying the optical image(s) in accordance with the image data output by the output unit 132, and a light source 133B for irradiating light to the liquid crystal panel 133A.

The projecting unit 133 projects the optical image(s) of the target object on the screen 11 by the light irradiated from the light source 1333 and transmitted through the liquid crystal panel 133A. Specifically, the light transmitted through the liquid crystal panel 133A is reflected by a half mirror 104 and reflectors 105, 106, 107 provided inside the head 103 so as to be irradiated on the screen 11.

The second image-forming unit 14 includes a projection lens 142 for projecting on the screen 11 light irradiated by the later-described illuminator 18 and reflected by the target object.

The projection lens 142 is provided below the head 103 of the body 10.

The light irradiated by the illuminator 18 and reflected by the target object is transmitted through the half mirror 104 after having passed the projection lens 142, and then reflected by the reflectors 105, 106, 107 to be irradiated on the screen 11.

The switch 15 includes: a support 151 for supporting the image pickup 131 and the projection lens 142 in such a manner that the positions of the pickup 131 and the lens 142 can be switched; and a stopper 152 for stopping the light from being directed to the half mirror 104 from the projecting unit 133 or the projection lens 142.

The support 151, which is provided below the head 103 of the body 10, includes: a substantially-cylindrical fixed member 153 having an opening that faces the half mirror 104; and a substantially disk-shaped rotary member 154 supported by the fixed member 153.

The rotary member 154 is supported rotatably around its disk center within the XY plane. When the rotary member 154, which is provided with the image pickup 131 and the projection lens 142 on the lower face thereof, is rotated, either one of the image pickup 131 and the projection lens 142 can be positioned below the fixed member 153.

When the projection lens 142 is positioned below the fixed member 153, the upper face of the projection lens 142 faces the half mirror 104 through the opening of the fixed member 153 with no obstacle being present between the projection lens 142 and the half mirror 104.

The stopper 152 includes: a feeding circuit 152A for controlling power feeding to the light source 133B of the projecting unit 133; and the rotary member 154 (152B) of the support 151.

The feeding circuit 152A controls the power feeding to the light source 133B in conjunction with the rotation of the rotary member 154 (152B) of the support 151. Specifically, when the projection lens 142 is positioned below the fixed member 153, the feeding circuit 152A stops feeding power to the light source 133B so as to stop the light from being irradiated on the half mirror 104 by the projecting unit 133. On the other hand, when the image pickup 131 is positioned below the fixed member 153, the feeding circuit 152A feeds power to the light source 133B so as to allow the light to be irradiated on the half mirror 104 by the projecting unit 133.

When the image pickup 131 is located below the fixed member 153, the projection lens 142 is spaced apart from the position below the fixed member 153, thereby preventing the light from being directed from the projection lens 142 to the half mirror 104. In other words, the rotary member 154 (152B) of the support 151 serves as the stopper 152.

The illuminator 18 includes: a light source 181 provided on a front face of the trunk 102 of the body 10 for irradiating light to the image pickup 131 or the projection lens 142 in a substantially horizontal direction; and half mirrors 182, 183 respectively provided within the image pickup 131 and the projection lens 142.

As shown in FIG. 2, when the projection lens 142 is positioned below the fixed member 153, the light irradiated by the light source 181 is reflected by the half mirror 183 provided within the projection lens 142 so as to be directed downward in FIG. 2 (i.e., directed to the target object).

On the other hand, when the image pickup 131 is positioned below the fixed member 153, the light irradiated by the light source 181 is reflected by the half mirror 182 provided within the image pickup 131 so as to be directed downward in FIG. 2 (i.e., directed to the target object).

The operation terminal 17 includes a display 172 and operation buttons 173 as shown in FIG. 1. The display 172 exemplarily displays simple data such as a displacement of the stage 12 detected by the detector 121. The operation buttons 173 are for performing various measurement-related operations.

The operation terminal 17, which is connected to the body 10 via a connecting cable 122, is mounted on a stand 174.

Figure 3:
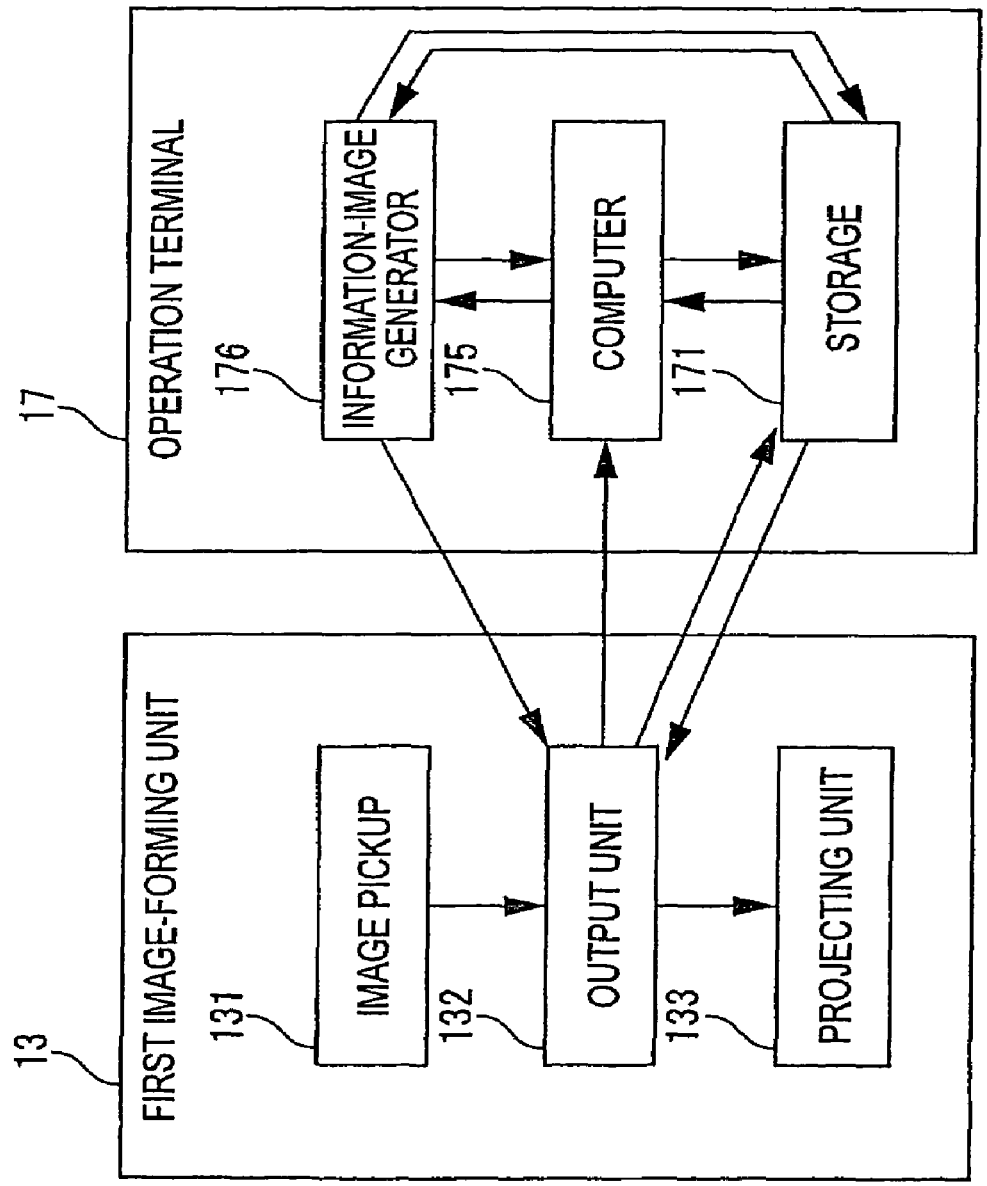
FIG. 3 schematically shows arrangements of the first image-forming unit and an operation terminal of the optical measuring machine according to the first embodiment.

FIG. 3 schematically shows arrangements of the first image-forming unit 13 and the operation terminal 17.

The first image-forming unit 13 includes the image pickup 131, the output unit 132 and the projecting unit 133.

Optical image(s) picked up by the image pickup 131 is output by the output unit 132 as digital image data so as to be projected on the screen 11 by the projecting unit 133.

On the other hand, the operation terminal 17 includes: the storage 171 for storing optical image(s); a computer 175 for computing positional information of target portion(s) of the target object; and an information-image generator 176 for generating information image(s) for displaying measurement-related information.

The storage 171 stores the image data output by the output unit 132 in a recording medium such as a semiconductor memory. The recording medium may be housed within the operation terminal 17 or may be externally provided to the operation terminal 17.

In addition, the storage 171 can read image data having been previously stored, and output the read data to the projecting unit 133 via the output unit 132. At this time, the projecting unit 133 projects the optical image(s) in accordance with the previously-stored image data on the screen 11 singularly or simultaneously with the current optical image(s).

An exemplary method of projecting the previous optical image(s) and the current optical image(s) together is to partition a projection region of the screen 11 into two sections and to project the previous optical image(s) on a first section while projecting the current optical image(s) on a second section.

The computer 175 computes positional information of the target portion(s) based on the image data output by the output unit 132 and the displacement of the stage 12 detected by the detector 121. The computer 175 derives a dimension, a shape or the like of the target object from the positional information of the plural target portions.

The computer 175 specifies edge section(s) (target portion(s)) of the target object and computes the positional information thereof.

The computed positional information of the target portion(s) is output to the storage 171 and the information-image generator 176.

The storage 171 can store the positional information in a recording medium singularly or together with the image data. On the other hand, the computer 175 can obtain previously-stored image data and previously-stored positional information via the storage 171 and compute positional information of a new target potion based on the previously-stored data and information.

The information-image generator 176 generates information image(s) for displaying measurement-related information.

Examples of the measurement-related information are a standard shape pattern, a shape pattern customized by an operator, and determination of tolerance between the patterns and the actually-measured shape.

In addition, the information-image generator 176 can also generate such information image as exemplified by a character string "Measurement point 1: Coordinate (X,Y)" based on the positional information of the target portion(s) output by the computer 175.

On the other hand, the output unit 132 outputs the information image(s) generated by the information-image generator 176 and the optical image(s) together as digital image data. Then, the projecting unit 133 forms the information image(s) and the optical image(s) on the screen.

An exemplary method of combining the information image(s) and the optical image(s) is to superpose a diagram representing a standard shape pattern or a character string representing the positional information of the target portion(s) on the optical image(s).

The storage 171 can store the measurement-related information and the information image(s) in a recording medium singularly or together with the image data.

On the other hand, the information-image generator 176 can obtain previously-stored image data, previously-stored measurement-related information and previously-stored information image(s) via the storage 171 and compute new information image(s) based on the previously-stored data, information and image(s).

[Operation(s) of Optical Measuring Machine]

Operation(s) of measuring a dimension, a shape or the like of the target object using the above-described optical measuring machine 1 will be described below.

[Measurement with First Image-Forming Unit]

In FIG. 1, the target object is initially mounted on the stage 12.

Next, the rotary member 154 is rotated so that the image pickup 131 is positioned below the fixed member 153 of the switch 15 in FIG. 2.

Then, the feeding circuit 152A (stopper 152) feeds power to the light source 133B of the projecting unit 133, thereby lighting the light source 133B.

On the other hand, the image pickup 131 sequentially picks up the optical image(s) of the target object, and the output unit 132 outputs the optical image(s) picked up by the image pickup 131 as digital image data.

The projecting unit 133 displays the optical image(s) on the liquid crystal panel 133A in accordance with the image data output by the output unit 132.

At this time, the light irradiated by the light source 133B of the projecting unit 133 is transmitted through the liquid crystal panel 133A, reflected by the half mirror 104 and the reflectors 105, 106, 107 and irradiated on the screen 11.

The optical image(s) of the target object is accordingly projected on the screen 11.

Subsequently, the target portion of the optical image of the target object projected on the screen 11 is moved to the intersection of the cross hairs 111 by moving the stage 12 in FIG. 1.

At this time, the positional information of the target portion can be derived from information such as a displacement of the stage 12 displayed on the display 172 of the operation terminal 17.

Alternatively, the positional information of the target portion can also be obtained by using the computer 175 (see FIGS. 1 to 3).

In this case, the computer 175 can realize an image measurement using image-processing functions, according to which the edge section of the target object included in the optical image is specified so as to compute the positional information thereof.

The positional information computed by the computer 175 is displayed on the display 172. In addition, the information image, which is generated by the information-image generator 176 based on the positional information, can also be projected on the screen 11 together with the current optical image.

By operating the storage 171 with the operation buttons 173, the image data of the ongoing optical image can be stored at any timing during the measurement.

[Measurement with Second Image-Forming Unit]

In FIG. 1, the target object is initially mounted on the stage 12.

Next, the rotary member 154 is rotated so that the projection lens 142 is positioned below the fixed member 153 of the switch 15 in FIG. 2.

Then, the light irradiated by the light source 181 of the illuminator 18 is irradiated on the target object via the half mirror 183 provided within the projection lens 142.

The light irradiated from the illuminator 18 and reflected by the target object is transmitted through the half mirror 104 after having passed the projection lens 142, and then reflected by the reflectors 105, 106, 107 to be directed to the screen 11.

The optical image(s) of the target object is accordingly projected on the screen 11.

Subsequently, the target portion of the optical image of the target object projected on the screen 11 is moved to the intersection of the cross hairs 111 by moving the stage 12 in FIG. 1.

At this time, the positional information of the target portion can be derived from information such as a displacement of the stage 12 displayed on the display 172 of the operation terminal 17.

[Effect(s) and Advantage(s) of First Embodiment]

The present embodiment provides below-described effects.

(1) Since the storage 171 included in the optical measuring machine 1 stores the optical image(s) of the target object as image data, there is no need to separately prepare a photographic device, or there is no need to provide a photographing unit to the optical measuring machine 1. Accordingly, the stored optical images are less likely to vary depending on photographing conditions or photographers, and the entirety of the optical image(s) can be observed without hindrance because no photographing unit impedes the projection of images by the first or second image-forming unit 13, 14.

Thus, without requiring a photographic device to be separately prepared, the optical measuring machine 1 according to the present invention can store the optical image(s) while simultaneously measuring the target object.

(2) Since the optical image(s) are displayed using the screen 11 and the image-forming unit (first or second image-forming unit 13, 14), the display size of the optical image(s) can be enlarged by merely increasing the size of the screen 11, thereby easily realizing enlargement of the display size with low cost.

Another advantage of the optical measuring machine I according to the present invention including the screen 11 and the image-forming unit (first or second image-forming unit 13, 14) is that the optical measuring machine 1 can be operated in the same manner as a conventional so-called projector.

(3) Since the projecting unit 133 uses the liquid crystal panel 133A, the optical image(s) can be highly finely projected on the screen 11, and the machine arrangement can be simplified while electric power is saved.

(4) A dimension, a shape or the like of the target object can be derived from the positional information of the plural target portions computed by the computer 175.

Since the computer 175 specifies the target portion(s), measurement errors due to a sensory difference between operators can be prevented, whereby a measurement of high accuracy can be conducted.

(5) Since the information image(s) generated by the information-image generator 176 for displaying measurement-related information can be projected on the screen 11 together with the optical image(s), an operator can measure a dimension, a shape or the like of the target object while observing the measurement-related information using the information image(s) projected on the screen 11.

(6) By selecting either one of the first image-forming unit 13 and the second image-forming unit 14 by the switch 15, the optical image(s) of the target object can be projected on the screen 11.

When the first image-forming unit 13 is used, for instance, slight difference(s) in hue, brightness or the like may not be accurately displayed because the first image-forming unit 13 converts the optical image(s) into image data for outputting and reconverts the output image data into the optical image(s) to display the optical image(s). On the other hand, since there is no conversion of the optical image(s) when the second image-forming unit 14 is used, such slight difference(s) in hue, brightness or the like can be accurately displayed.

Depending on circumstances, the first image-forming unit 13 and the second image-forming unit 14 can be suitably selected by operating the switch 15.

(7) With a simple arrangement using the half mirror 104 and the stopper 152, the image-forming units can be switched between the first image-forming unit 13 and the second image-forming unit 14.

(8) Since the storage 171 can read previously-stored image data and output the image data to the projecting unit 133 via the output unit 132, the optical image(s) according to the previously-stored image data can be projected on the screen 11 singularly or simultaneously with the current optical image(s).

When the previous optical image(s) is displayed together with the current optical image(s), an operator can measure the dimension, the shape or the like of the target object while comparing the current optical image(s) with the previous optical image(s).

Second Embodiment

The present embodiment is different from the above first embodiment in the arrangement of the switch 15 and the location of the first image-forming unit 13, and in that the half mirror 104 is not provided. The other arrangements (and the operations thereof), which are the same between the embodiments, will be denoted by the same numerals, description of which will be omitted.

[Arrangement of Optical Measuring Machine]

Figure 4:
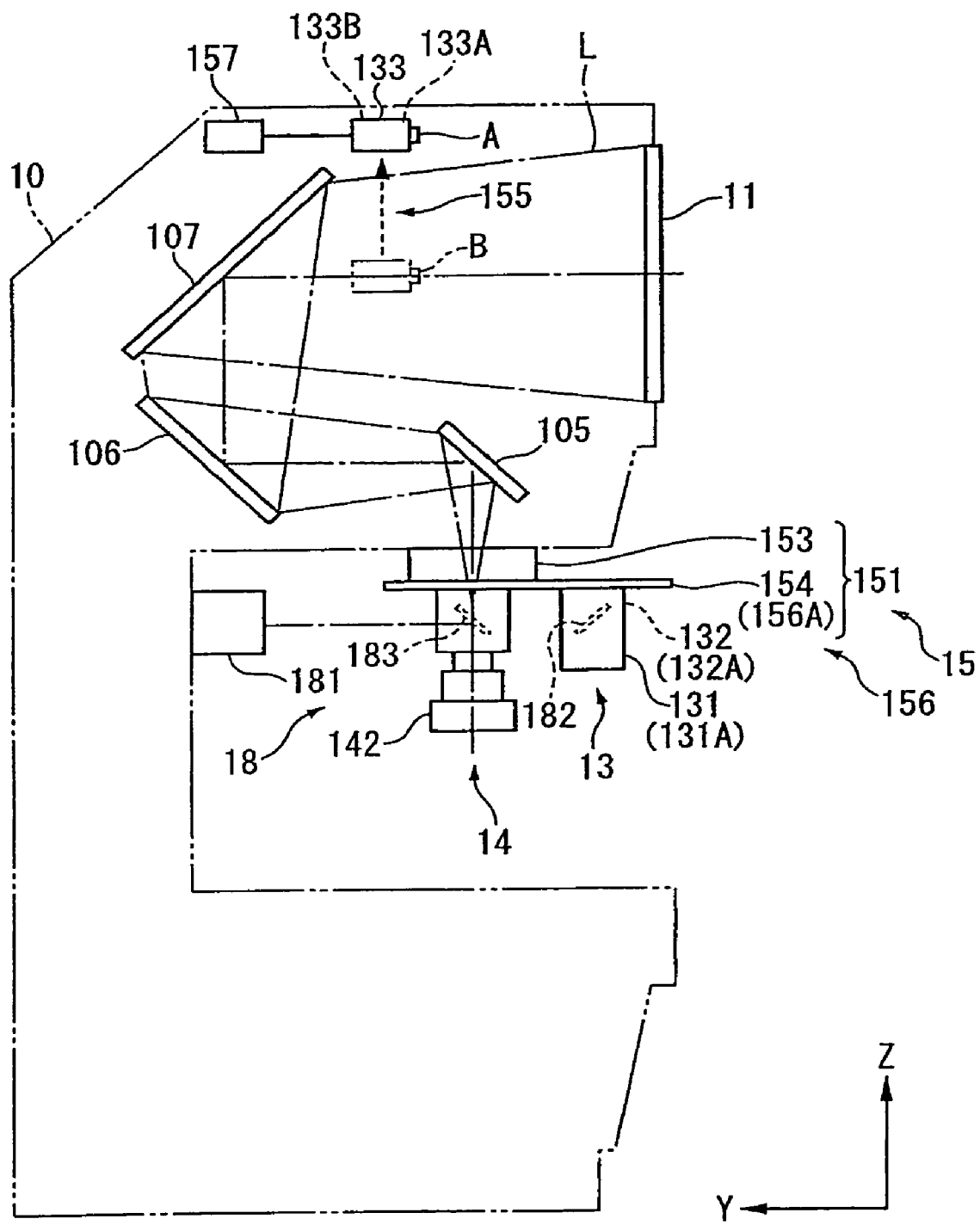
FIG. 4 schematically shows arrangements of a first image-forming unit, a second image-forming unit and a switch of an optical measuring machine according to a second embodiment of the present invention.
Figure 5:
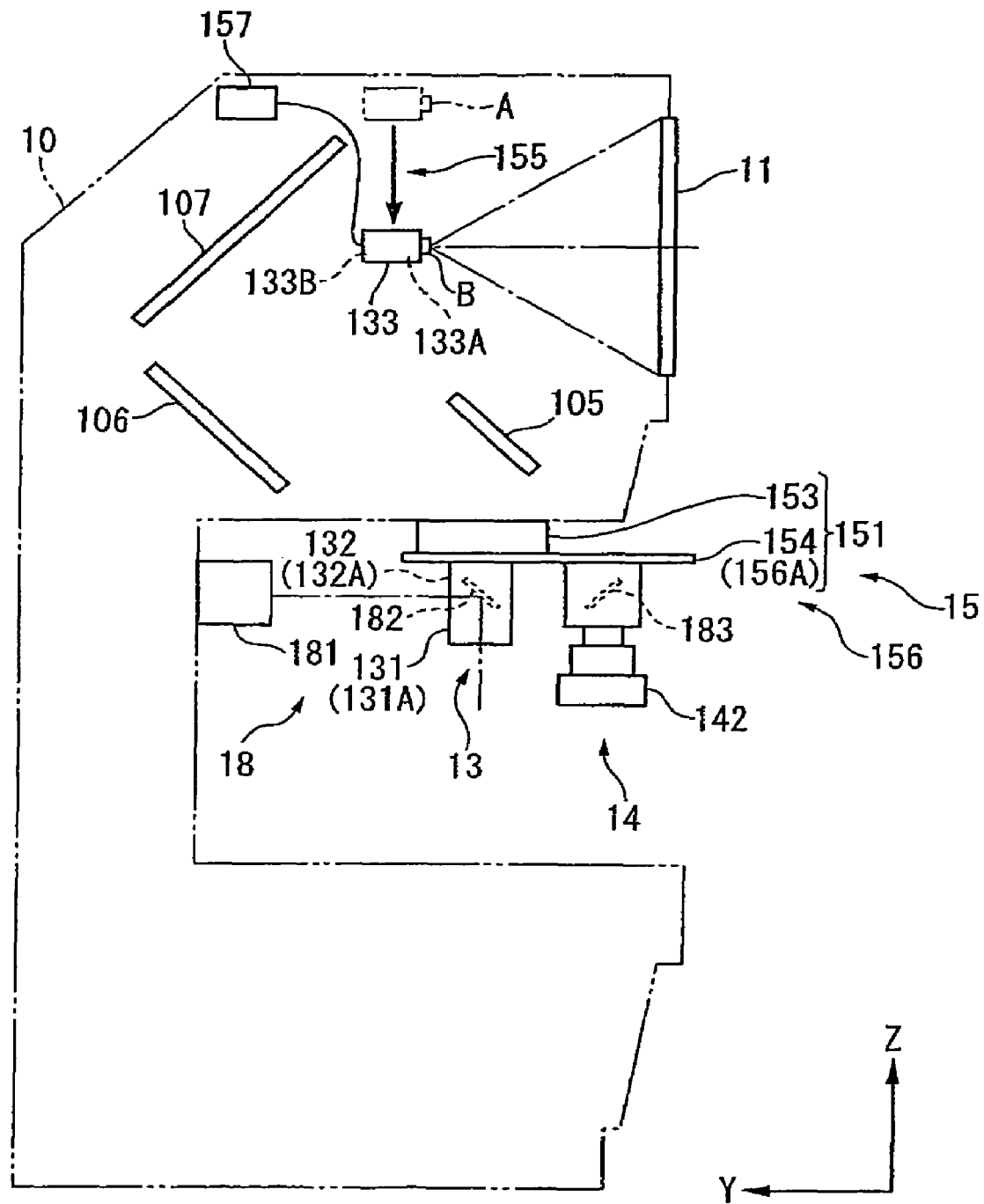
FIG. 5 schematically shows arrangements of the first image-forming unit, the second image-forming unit and the switch of the optical measuring machine according to the second embodiment.

FIGS. 4 and 5 schematically show arrangements of the first image-forming unit 13, the second image-forming unit 14 and the switch 15 of the optical measuring machine 1 according to the second embodiment of the present invention.

In the present embodiment, the projecting unit 133 of the first image-forming unit 13 is provided at a waiting point located outside of an optical path that extends from the projection lens 142 to the screen as shown in FIG. 4.

The switch 15 includes: a shifter 155 for moving the projecting unit 133 between the waiting position A and a projecting position B; a stopper 156 for stopping the irradiation of the light from the second image-forming unit 14 to the screen 11; and a feeding circuit 157 for controlling power feeding to the light source 133B of the projecting unit 133.

The shifter 155 moves the projecting unit 133 between the waiting position A and the projecting position B by a driving mechanism (not shown).

The waiting position A, which is located adjacent to the top of the head 103 within the head 103 of the body 10, is outside of the optical path L extending from the projection lens 142 of the second image-forming unit 14 to the screen 11.

The projecting position B is located in the vicinity of the center of the head 103 within the head 103 of the body 10, at which the projecting unit 133 can irradiate the light to the screen 11.

The shifter 155 moves the projecting unit 133 in conjunction with the rotation of the rotary member 154 of the support 151.

Specifically, the shifter 155 moves the projecting unit 133 to the waiting position A when the projection lens 142 is positioned below the fixed member 153 while moving the projecting unit 133 to the projecting position B when the image pickup 131 is positioned below the fixed member 153.

The stopper 156, which includes the rotary member 154 (156A) of the support 151, stops the irradiation of the light from the second image-forming unit 14 to the screen 11 when the projecting unit 133 is positioned at the projecting position B.

Considering the operation(s) of the above shifter 155, "when the projecting unit 133 is positioned at the projecting position B" means "when the image pickup 131 is positioned below the fixed member 153". At this time, the projection lens 142 is spaced apart from the position below the fixed member 153 as shown in FIG. 5, so that the irradiation of the light from the projection lens 142 to the screen 11 is blocked. In other words, the rotary member 154 (156A) of the support 151 serves as the stopper 156.

The feeding circuit 157 controls the power feeding to the light source 133B in conjunction with the rotation of the rotary member 154 of the support 151. Specifically, when the projection lens 142 is positioned below the fixed member 153, the feeding circuit 157 stops feeding power to the light source 133B so as to stop the light from being irradiated to the screen 11 from the projecting unit 133. On the other hand, when the image pickup 131 is positioned below the fixed member 153, the feeding circuit 152A feeds power to the light source 133B so as to allow the light to be irradiated to the screen 11 from the projecting unit 133.

[Operation(s) of Optical Measuring Machine]

Operation(s) of measuring a dimension, a shape or the like of the target object using the above-described optical measuring machine 1 will be described below.

[Measurement with First Image-Forming Unit]

In FIG. 1, the target object is initially mounted on the stage 12.

Next, the rotary member 154 is rotated so that the image pickup 131 is positioned below the fixed member 153 of the switch 15 in FIG. 5.

Then, the shifter 155 moves the projecting unit 133 to the projecting position B while the feeding circuit 157 feeds power to the light source 133B so that the light is irradiated from the projecting unit 133 to the screen 11.

At this time, the projection lens 142 is spaced apart from the position below the fixed member 153, so that the irradiation of the light from the projection lens 142 to the screen 11 is blocked.

The image pickup 131 and other components are operated in the same manner as in the above first embodiment so as to display the optical image(s) on the liquid crystal panel 133A.

The optical image(s) of the target object is accordingly projected on the screen 11.

Subsequently, the target portion of the optical image of the target object projected on the screen 11 is moved to the intersection of the cross hairs 111 by moving the stage 12 in FIG. 1.

At this time, the positional information of the target portion can be derived from information such as a displacement of the stage 12 displayed on the display 172 of the operation terminal 17.

The operations of the storage 171, the computer 175 and the other components are the same as in the above first embodiment.

[Measurement with Second Image-Forming Unit]

In FIG. 1, the target object is initially mounted on the stage 12.

Next, the rotary member 154 is rotated so that the projection lens 142 is positioned below the fixed member 153 of the switch 15 in FIG. 4.

Then, the shifter 155 moves the projecting unit 133 to the waiting position A while the feeding circuit 157 stops feeding power to the light source 133B so as to stop the light from being irradiated from the projecting unit 133 to the screen 11.

On the other hand, the light source 181 of the illuminator 18 irradiates the light on the target object via the half mirror 183 provided within the projection lens 142.

The light irradiated by the illuminator 18 and reflected by the target object, after passing through the projection lens 142, is reflected by the reflectors 105, 106, 107 to be directed to the screen 11.

The optical image(s) of the target object is accordingly projected on the screen 11.

Subsequently, the target portion of the optical image of the target object projected on the screen 11 is moved to the intersection of the cross hairs 111 by moving the stage 12 in FIG. 1.

At this time, the positional information of the target portion can be derived from information such as a displacement of the stage 12 displayed on the display 172 of the operation terminal 17.

Effect(s) and Advantage(s) of Second Embodiment

According to the present embodiment, effects described below will be obtained in addition to the effects and advantages (1) to (6) and (8) of the above first embodiment.
(9) With a simple arrangement using the shifter 155 and the stopper 156, the image-forming units can be switched between the first image-forming unit 13 and the second image-forming unit 14.
(10) Since the optical image(s) is projected on the screen 11 with no half mirror 104 being interposed in the optical path, brightness of the optical image(s) displayed on the screen 11 can be enhanced as compared with the above first embodiment.

[Modification(s)]

The present invention is not limited to the embodiment(s) described above, but includes other arrangements as long as an object of the present invention can be achieved, which also includes the following modification(s).
(i) In the above first embodiment, the half mirror 104 and the projecting unit 133 may not necessarily be located at the positions shown in FIG. 2.

For instance, a relatively-large half mirror may be provided between the reflector 106 and the reflector 107 while providing the projecting unit 133 at such a position as to irradiate the light to this half mirror, such that the light reflected by this half mirror may be projected on the screen 11 via the reflector 107.

With this arrangement, the same excellent effects and advantages as in the above first embodiment can also be obtained.

Alternatively, a totally-reflecting mirror that is moved in conjunction with the rotation of the rotary member 154 so as to be positioned at the same position as the half mirror 104 when the image pickup 131 is positioned below the fixed member 153 may be provided in place of the half mirror 104 in the above first embodiment.

With this arrangement, the light irradiated by the light source 133B of the projecting unit 133 is also transmitted through the liquid crystal panel 133A, reflected by the reflectors 105, 106, 107 and irradiated on the screen 11.

The optical image(s) of the target object is accordingly projected on the screen 11.

On the other hand, when the projection lens 142 is positioned below the fixed member 153, the totally-reflecting mirror is located at a position different from that of the half mirror 104 in the first embodiment, so that the light irradiated by the projecting unit 133 does not reach the reflector 105, i.e., the light is not projected on the screen 11.

Thus, with this arrangement, the same excellent effects and advantages as in the above first embodiment can also be obtained.
(ii) Although the waiting position A is located adjacent to the top of the head 103 within the head 103 of the body 10 while the projecting position B is located in the vicinity of the center of the head within the head 103 of the body 10 in the above second embodiment, the arrangement is not limited thereto.

The waiting position A may be located at any other position as long as the waiting position A is outside of the optical path L extending from the projection lens 142 of the second image-forming unit 14 to the screen 11 while the projecting position B may be located at any other position as long as the projecting unit 133 can irradiate the light to the screen 11.

For instance, the waiting position A may be located adjacent to the bottom of the head 103 within the head 103 of the body 10.

With this arrangement, the same excellent effects and advantages as in the above second embodiment can also be obtained.
(iii) Although the operation terminal 17 is externally provided in the above embodiments, the arrangement is not limited thereto.

For instance, the same arrangement as the operation terminal 17 may be provided on the body 10.

With this arrangement, the same excellent effects and advantages as in the above embodiments can also be obtained. In addition, since no operation terminal 17 is externally provided, the machine requires a smaller installation space.
(iv) Although the projecting unit 133 projects the optical image(s) of the target object on the screen 11 by the light irradiated from the light source 133B and transmitted through the liquid crystal panel 133A in the above embodiments, the arrangement is not limited thereto.

For instance, a reflection-type liquid crystal panel may be used. With this arrangement, not only the same excellent effects and advantages as in the above embodiments can also be obtained, but also the brightness can be enhanced because an opening ratio of such a liquid crystal panel is larger than that of the transmission-type liquid crystal panel 133A.

In addition, the projecting unit 133 may be a digital light processing (DLP) projector that projects image(s) using a digital mirror device (DMD) that includes a plurality of small mirrors for controlling the brightness by gradient of the mirrors. With this arrangement, the same excellent effects and advantages as in the above embodiments can also be obtained. Examples of further advantages of such an arrangement are that light is less likely to enter black image(s), that image grating is less visible and that residual image(s) and burning are less likely to occur.
(v) Although the illuminator 18 is a so-called reflection-type illuminator in the above embodiments, the arrangement is not limited thereto.

For instance, the illuminator 18 may be a transmission-type illuminator provided below the stage 12.

With this arrangement, light having been transmitted from the target object can also be directed to the screen 11, thereby providing the same excellent effects and advantages as in the above embodiments.
(vi) Although the rotary member 154 supports the image pickup 131 and the projection lens 142 in such a manner that the positions of the pickup 131 and the lens 142 can be switched in the above embodiments, the arrangement is not limited thereto.

Figure 6:
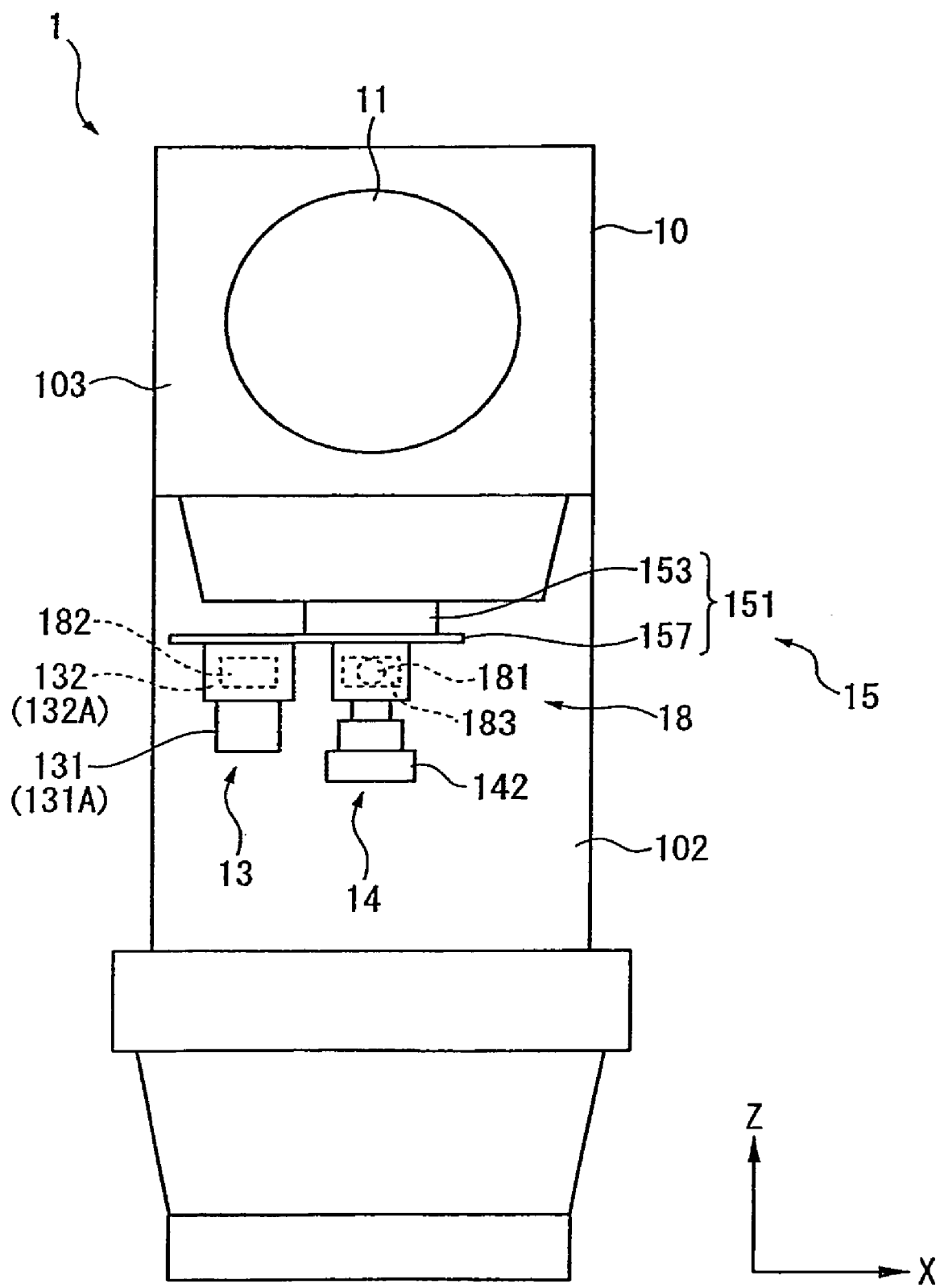
FIG. 6 is a front view schematically showing an optical measuring machine according to a modified embodiment of the present invention.

For instance, such an arrangement as shown in FIG. 6 may be adopted.

FIG. 6 is a front view schematically showing the optical measuring machine 1 according to this modification.

The optical measuring machine 1 according to this modification is different from those according to the above embodiments in the arrangement of the switch 15.

In the optical measuring machine 1 according to this modification, the support 151 of the switch 15 includes a slide member 157 that supports the image pickup 131 and the projection lens 142 in such a manner that the pickup 131 and the lens 142 are slidable in the X direction relative to the body 10.

With this arrangement, not only the same excellent effects and advantages as in the above embodiments can also be obtained, but also the arrangement of the optical measuring machine 1 can be simplified because a singular light source 181 is required for forming the illuminator 18.

The priority application Number JP 2007-104562 upon which this patent application is based is hereby incorporated by reference.

What is claimed is:

1. An optical measuring machine, comprising:
    a screen;
    a movable stage;
    an illuminator that irradiates light on a target object mounted on the stage;
    a detector that detects a displacement of the stage;
    a first image-forming unit and a second image-forming unit that respectively form an optical image of the target object mounted on the stage on the screen;
    a switch that switches image-forming units used for forming the optical image on the screen between the first image-forming unit and the second image-forming unit;
    a storage that stores the optical image; and
    a half mirror provided on an optical path extending from the projection lens of the second image-forming unit to the screen, wherein
    the first image-forming unit comprises: an image pickup that picks up the optical image; an output unit that outputs the optical image picked up by the image pickup as digital image data; and a projecting unit that projects the optical image on the screen in accordance with the image data output by the output unit,
    the second image-forming unit comprises a projection lens that projects on the screen the light irradiated by the illuminator and reflected or transmitted by the target object,
    the storage stores the image data output by the output unit of the first image-forming unit,
    the first image-forming unit forms the optical image on the screen using light reflected or transmitted by the half mirror,
    the second image-forming unit forms the optical image on the screen using the light transmitted or reflected by the half mirror, and
    the switch comprises a stopper that stops irradiation of the light from either one of the image-forming units selected from the first image-forming unit and the second image-forming unit to the half mirror.

2. The optical measuring machine according to claim 1, wherein
    the projecting unit comprises: a liquid crystal panel that displays the optical image in accordance with the image data; and a light source that irradiates light on the liquid crystal panel, and
    the projecting unit projects the optical image using the light that is: irradiated by the light source; and reflected or transmitted by the liquid crystal panel.

3. The optical measuring machine according to claim 1, further comprising
    a computer that computes positional information of target portion(s) of the target object, wherein
    the computer computes the positional information of the target portion(s) based on the image data and the displacement of the stage detected by the detector.

4. The optical measuring machine according to claim 1, further comprising
    an information-image generator that generates an information image for displaying measurement-related information, wherein
    the output unit outputs as digital image data both the information image generated by the information-image generator and the optical image picked up by the image pickup.

5. An optical measuring machine, comprising:
    a screen;
    a movable stage;
    an illuminator that irradiates light on a target object mounted on the stage;
    a detector that detects a displacement of the stage;
    a first image-forming unit and a second image-forming unit that respectively form an optical image of the target object mounted on the stage on the screen;
    a switch that switches image-forming units used for forming the optical image on the screen between the first image-forming unit and the second image-forming unit; and
    a storage that stores the optical image, wherein
    the first image-forming unit comprises: an image pickup that picks up the optical image; an output unit that outputs the optical image picked up by the image pickup as digital image data; and a projecting unit that projects the optical image on the screen in accordance with the image data output by the output unit,
    the second image-forming unit comprises a projection lens that projects on the screen the light irradiated by the illuminator and reflected or transmitted by the target object, and
    the storage stores the image data output by the output unit of the first image-forming unit; and wherein
    the projecting unit of the first image-forming unit is provided at a waiting position located outside of the optical path extending from the projection lens of the second image-forming unit to the screen,
    the switch comprises: a shifter that moves the projecting unit between the waiting position and a projecting position, the projecting position being a position at which the projecting unit is capable of irradiating the light on the screen; and a stopper that stops irradiation of the light from the second image-forming unit to the screen, and
    the stopper stops the irradiation of the light from the second image-forming unit to the screen when the projecting unit is positioned at the projecting position.

6. The optical measuring machine according to claim 5, wherein
    the projecting unit comprises: a liquid crystal panel that displays the optical image in accordance with the image data; and a light source that irradiates light on the liquid crystal panel, and
    the projecting unit projects the optical image using the light that is: irradiated by the light source; and reflected or transmitted by the liquid crystal panel.

7. The optical measuring machine according to claim 5, further comprising
    a computer that computes positional information of target portion(s) of the target object, wherein
    the computer computes the positional information of the target portion(s) based on the image data and the displacement of the stage detected by the detector.

8. The optical measuring machine according to claim 5, further comprising
    an information-image generator that generates an information image for displaying measurement-related information, wherein
    the output unit outputs as digital image data both the information image generated by the information-image generator and the optical image picked up by the image pickup.

* * * * *